United States Patent [19]

Cifuentes et al.

[11] Patent Number: 5,110,891

[45] Date of Patent: May 5, 1992

[54] AMINE FUNCTIONAL SILOXANES

[75] Inventors: Martin E. Cifuentes; David B. Selley, both of Midland, Mich.

[73] Assignee: Dow Corning Corporation, Midland, Mich.

[21] Appl. No.: 683,898

[22] Filed: Apr. 11, 1991

[51] Int. Cl.$^5$ .............................................. C08G 77/04
[52] U.S. Cl. ........................................ 528/34; 528/38
[58] Field of Search ................................... 528/34, 38

[56] References Cited

U.S. PATENT DOCUMENTS

| | | | |
|---|---|---|---|
| 3,508,933 | 4/1970 | Yates | 106/10 |
| 3,773,607 | 11/1973 | Marzocchi et al. | 528/38 |
| 3,836,371 | 9/1974 | Kokoszka | 106/10 |
| 3,890,271 | 6/1975 | Kokoszka | 260/46.5 |
| 3,960,575 | 6/1976 | Martin | 106/10 |
| 4,013,475 | 3/1977 | Liebowitz | 106/10 |
| 4,020,217 | 4/1977 | Karasudani et al. | 528/38 |
| 4,218,250 | 8/1980 | Kasprzak | 106/3 |
| 4,525,566 | 6/1985 | Homan et al. | 528/38 |
| 4,680,366 | 7/1987 | Tanaka et al. | 528/38 |
| 4,689,085 | 8/1987 | Plueddemann | 106/287.14 |
| 4,846,887 | 7/1977 | Kuehnle | 106/31 |
| 4,898,614 | 2/1990 | Halloran | 106/3 |
| 4,996,112 | 2/1991 | Perrin et al. | 528/34 |

*Primary Examiner*—John C. Bleutge
*Assistant Examiner*—M. W. Glass
*Attorney, Agent, or Firm*—Jim L. DeCesare

[57] ABSTRACT

A polish formulation containing as components thereof at least one member selected from the group consisting of waxes, solvents, surfactants, thickening agents, abrasives, dyes, odorants and other ingredients normally used in making polishes. The improvement resides in incorporating into the polish formulation a novel reactive amine functional silicone polymer.

7 Claims, No Drawings

AMINE FUNCTIONAL SILOXANES

BACKGROUND OF THE INVENTION

This invention relates to a polish formulation and more particularly to a polish formulation containing new silicone polymers which provide the polish formulation with improved gloss and rub out characteristics and ease of application.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish rely upon a deposited film. Car and boat polish formulations result in a glossy and protective film and may contain abrasives for removing weathered paint and soil as well as old built-up polish. Metal polishes contain ingredients for abrasive smoothing of the surface being treated and for surface cleaning as well as components that function to remove and retard the build-up of tarnish.

Motor vehicle polish is specially formulated in order to remove road film and oxidized paint and to provide a continuous glossy film which resists water and its removal by water and car wash detergents. Such vehicle polishes contain several major functional ingredients including an abrasive. The abrasive however must be mild enough to avoid scratching of the painted surface and representative of mild acting materials are fine grades of aluminum silicate, diatomaceous earth and silicas. Straight and branched chain aliphatic hydrocarbons are employed to facilitate the detergency of the polish against oil based traffic soils and debris and provide solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and durability of the polish against environmental antagonists. Exemplary waxes are paraffin wax, microcrystalline petroleum wax, carnauba wax, candelilla vegetable wax, montan coal derived wax and synthetic polymeric waxes such as oxidized polyethylene.

Silicone materials are included in polishes as the other film forming ingredient. Such silicone materials also function as lubricants for easing the application of the polish as well as its buffing and act as release agents for dried abrasive. The silicone materials spread easily, provides a uniform high gloss and water repellency. Such materials typically are dimethylsilicones however aminofunctional silicone products are becoming more prevalent. The aminofunctional silicone products result in films having increased resistance to removal from the surface by detergents and the environment as a result of their ability to plate out on a painted surface and to crosslink and bond to that surface.

A car polish may also contain an emulsifier, a thickener, and a stabilizer for the production of a homogeneous stable product of desired consistency. Such polishes may be solid in form, semisolid, presoftened or liquid. The polish can be solvent based or an emulsion and in either case the polish may be a liquid, semi-solid or solid in constitution. Typically liquid emulsions include five to twenty weight percent of an abrasive, ten to thirty-five weight percent of solvent, two to fifteen weight percent of a silicone material and up to about five weight percent wax. In an emulsion paste formulation the wax ingredient is increased in level from three to twenty-five weight percent.

Polish formulations containing organosilicon compounds are not new. For example aminofunctional siloxanes have been employed in polish formulations as shown in U.S. Pat. No. 3,508,933 issued Apr. 28, 1970. Such aminofunctional silicones are also disclosed as ingredients in various polish formulations in U.S. Pat. No. 3,836,371 issued Sep. 17, 1974; U.S. Pat. No. 3,890,271 issued Jun. 17, 1975; U.S. Pat. No. 3,960,575 issued Jun. 1, 1976; U.S. Pat. No. 4,013,475 issued Mar. 22, 1977; U.S. Pat. No. 4,218,250, issued Aug. 19, 1980; and in U.S. Pat. No. 4,898,614 issued Feb. 6, 1990. However, the prior art does not teach the use of the instant novel polymers in polish formulations.

SUMMARY OF THE INVENTION

This invention is directed to a polish formulation containing as components thereof at least one member selected from the group consisting of waxes, solvents, surfactants, thickening agents, abrasives, dyes, odorants and other ingredients normally used in making polishes. The improvement resides in incorporating into the polish formulation a new and novel reactive silicone polymer.

The polish formulation is preferably water based and can be in the form of a water in oil emulsion polish although the polish formulation may also be formulated in the form of an oil in water emulsion polish. The polish formulation includes at least one organosilicon detergent resistant film forming compound which is a reactive aminofunctional polysiloxane.

These and other features, objects, and advantages of the herein described present invention will become more apparent from a consideration of the following detailed description thereof.

DETAILED DESCRIPTION

Waxes which may be employed in the polish formulations of this invention are well known in the art and can vary depending on the specific use intended for the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozocerite, ceresin, montan, paraffin, microcrystalline and petrolatum; and synthetic waxes such as ethylenic polymers, polyol ether-esters and chlorinated naphthalenes.

Abrasives which can be used are well known in the art and suitable abrasives include aluminum silicate, diatomaceous earth, pumice, fuller's earth, bentonite, silicas, tripoli, hydrated calcium silicate, chalk, colloidal clay, magnesium oxide red iron oxide, and tin oxide.

There may also be employed in polish formulations solvents such as VM&P naphtha, Stoddard solvent, naphtha mineral spirits, water, kerosene; surfactants such as polyoxyethylene sorbitan monooleate and fatty alcohol amine sulfates; thickening agents such as soya lecithin and methyl cellulose; detergent resistant additives such as dimethyl and carboxyfunctional silicones; colorants, odorants, corrosion inhibitors and other ingredients normally used in making polishes. Such ingredients are all well known to the skilled artisan. The invention is applicable to all forms of wax and/or abrasive containing polishes including solvent based polishes, water based emulsion polishes and paste wax polishes.

The detergent resistant additives can be organic polysiloxanes which are film formers having a viscosity in the range of about five to as high as several million centistokes preferably about 100 to about 10,000 centistokes. Preferably a mixture of polysiloxanes having relatively higher and relatively lower viscosities is employed. Such polysiloxanes have the repeating unit

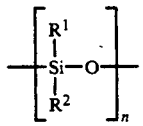

wherein n is an integer having a value greater than one, $R^1$ is an alkyl radical containing 1 to 7 carbon atoms inclusive or a phenyl group, $R^2$ is hydrogen, an alkyl radical containing 1 to 7 carbon atoms inclusive or a phenyl group. Illustrative polysiloxanes encompassed by the above formula are polydimethylsiloxane, polydiethylsiloxane, polymethylethylsiloxane, polymethylphenylsiloxane, polydiphenylsiloxanes, diphenylsilanediol and copolymers of any two or more of the foregoing siloxanes. Polysiloxane-oxyalkylene block copolymers may also be utilized.

In addition to the aforementioned organic polysiloxanes, the present compositions inlcude an aminofunctional polysiloxane. The aminofunctional polysiloxane is a silicone fluid with highly polar pendant aminoalkyl modifying groups that enhance the durability of the film and promotes adhesion of the film to a wide variety of substrates.

The present composition also contemplates an optional but preferred liquid silane constituent which promotes the mutual solubility of other organic silicone compounds present in the mixture. Suitable liquid silanes are represented by the formula $R^3$—Si(OR$^4$)$_3$ wherein $R^3$ can be an alkyl radical containing one to three carbon atoms inclusive or phenyl, and $R^4$ can be an alkyl radical containing one or two carbon atoms inclusive. A preferred liquid silane constituent is an alkyltrialkoxysilane such as methyltrimethoxysilane, ethyltriethoxysilane, phenyltrimethoxysilane, and phenyltriethoxysilane.

The aminofunctional siloxane compositions of the prior art may be represented by the formula:

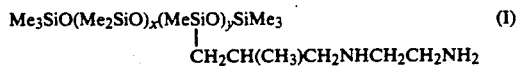
(I)

Such compositions are described in U.S. Pat. No. 3,508,933 issued Apr. 28, 1970; U.S. Pat. No. 3,836,371 issued Sept. 17, 1974, and in U.S. Pat. No. 3,890,271 issued Jun. 17, 1975.

In contrast to the conventional silicone polymer identified in formula (I) above, the new and novel amine functional siloxane polymers of the present invention have the formula $R_3SiO[R_2SiO]_x[RQ^1SiO]_y[RQSiO]_zSiR_3$      (II)

wherein R denotes an alkyl group of one to four carbons, OH, an alkoxy group or a phenyl group with the proviso that at least fifty percent of the total R groups are methyl; Q denotes an amine functional substituent of the formula —R$^2$Z, wherein R$^2$ is a divalent alkylene radical of three to six carbon atoms or a radical of the formula —CH$_2$CH$_2$CH$_2$OCH$_2$—CHOHCH$_2$— and Z is a monovalent radical which is selected from the group consisting of radicals such

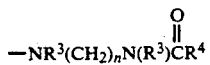

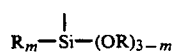

wherein $R^3$ denotes hydrogen or an alkyl group of one to four carbons, $R^4$ denotes an alkyl group of one to four carbons and n is a positive integer from two to six; x, y and z are integers the sum of which is within the range of about twenty-five to about eight hundred; and $Q^1$ denotes an amine functional substituent as defined above which additionally includes a carbon bonded silicon atom having at least one silicon-bonded hydrolyzable group. This can be represented by

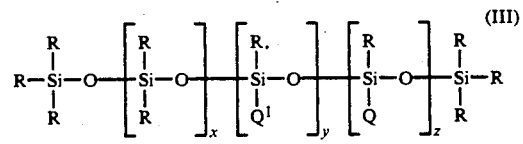

in which m is an integer having a value of zero, one or two. R for purposes of this radical is the same as defined above and y is at least one.

One amine functional siloxane polymer corresponding to formula (II) is

(III)

in which Q is —CH$_2$CHCH$_3$CH$_2$NHCH$_2$CH$_2$NH$_2$ and wherein $Q^1$ is —CH$_2$CHCH$_3$CH$_2$NHCH$_2$CH$_2$NHCH$_2$CH$_2$CH$_2$Si(OCH$_3$)$_3$. The sum of the integers x, y and z is about two hundred.

Useful R groups are radicals such as methyl, ethyl, propyl, isopropyl, butyl, isobutyl or phenyl with the proviso that at least fifty percent of the R groups are methyl. The R groups may all be the same or different.

In the formula for the amine functional substituent Q represented by —R$^2$Z, the alkylene radicals denoted by R$^2$ include trimethylene, tetramethylene, pentamethylene, —CH$_2$CHCH$_3$CH$_2$— and —CH$_2$CH$_2$CHCH$_3$CH$_2$—. Siloxane polymers wherein the R$^2$ radical denotes —CH$_2$CH$_2$CH$_2$OCH$_2$CHOHCH$_2$— may also be employed. Siloxanes wherein R$_2$ is trimethylene or an alkyl substituted trimethylene radical such as —CH$_2$CHCH$_3$CH$_2$— are preferred however.

Z represents an amine radical that may be substituted or unsubstituted. Preferred amine radicals as noted previously include

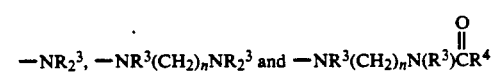

wherein $R^3$ denotes hydrogen or an alkyl group of one to four carbons, $R^4$ denotes an alkyl group of one to four carbons and n is a positive integer from two to six. Alkyl groups of one to four carbon atoms represented by $R^3$ and $R^4$ include methyl, ethyl, propyl, butyl, isopropyl or isobutyl. Useful Z radicals include unsubstituted amine radical such as $-NH_2$; alkyl substituted amine radicals such as $-NHCH_3$, $-NHCH_2CH_2CH_2CH_3$ and $-N(CH_2CH_3)_2$; aminoalkyl substituted amine radicals such as $-NHCH_2CH_2NH_2$, $-NH(CH_2)_6NH_2$ and $-NHCH_2CH_2CH_2N(CH_3)_2$; and aminoalkyl substituted amine radicals such as

—NHCH$_2$CH$_2$NHCCH$_3$ and

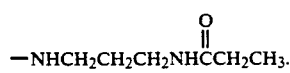
—NHCH$_2$CH$_2$CH$_2$NHCCH$_2$CH$_3$.

Siloxane polymers which are useful in accordance with the present invention may vary in viscosity and polymerization. For example in the formula

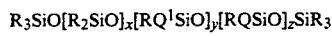
R$_3$SiO[R$_2$SiO]$_x$[RQ$^1$SiO]$_y$[RQSiO]$_z$SiR$_3$ the integers x, y and z have a sum within the range of about twenty-five to about eight hundred. However preferred siloxane polymers possess values of x, y and z within the range of fifty to four hundred.

These amine functional materials are prepared by reacting an amine functional silicone polymer with a silane coupling agent such as chloropropyltrimethoxysilane. Silane coupling agents are well known in the art as promoters of adhesion as evidenced for example by U.S. Pat. No. 4,689,085 issued Aug. 25, 1987. Typically these materials are employed as an interface between hydrophilic mineral surfaces such as glass and silica, and organic resins in order to couple these dissimilar surfaces.

Silane coupling agents are of the general structure $X_3Si(CH_2)_nY$ in which n is an integer from zero to three, X is a hydrolyzable group on silicon, and Y is a reactive organofunctional group. When applied from water solutions, the hydrolyzable groups generate intermediate silanols which migrate to the hydrophilic surface where they condense with surface hydroxyl groups to form "siloxane" bonds (—SiOSi—) with the surface. It is believed that coupling is achieved with the organic resin because of the compatibility between the resin and the reactive organofunctional group Y of the silane coupling agent.

Examples of some of the well known and commercial varieties of silane coupling agents are
N-(2-aminoethyl)-3-aminopropyltrimethoxysilane;
3-methacryloxypropyltrimethoxysilane;
N-[2-(vinylbenzylamino)ethyl]-3-aminopropyltrimethoxysilane;
3-glycidoxypropyltrimethoxysilane;
vinyltriacetoxysilane;
3-chloropropyltrimethoxysilane;
2-(3,4-epoxycyclohexyl)-ethyltrimethoxysilane;
3-mercaptopropyltrimethoxysilane; and
2-mercaptoethyltrimethoxysilane.

The products are reactive silicone polymers containing hydrolyzable functionality on the alkylamino substituent on silicon. The following examples are set forth for the purpose of further illustrating the concepts of the present invention.

EXAMPLE I

One hundred grams of a silicone fluid corresponding to the formula

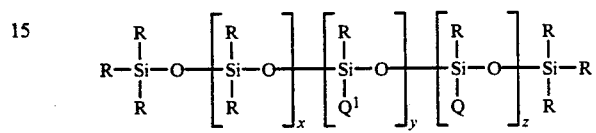

in which Q is $-CH_2CHCH_3CH_2NHCH_2CH_2NH_2$ and wherein Q$^1$ is $-CH_2CHCH_3CH_2NHCH_2CH_2NH_2$ having a degree of polymerization of about two hundred and 2.5 mole percent of diamine substitution was heated in a vessel to one hundred-twenty degrees Centigrade under a nitrogen blanket. To the heated amine fluid in the vessel was added 11.9 grams of chloropropyltrimethoxysilane. This mixture was agitated for two hours and allowed to cool. A product corresponding to the silicone polymer shown in formula (III) was isolated and recovered.

EXAMPLE II

Polish formulations containing the silicone polymer recovered in Example I were prepared. The polishes contained the following ingredients:

| Ingredient | Weight Percent | Grams |
|---|---|---|
| Water | 55.3 | 442.4 |
| Propylene glycol | 1.0 | 8.0 |
| Sodium borate | 0.5 | 4.0 |
| Kerosene | 26.2 | 209.6 |
| Silicone polymer of Example I | 4.0 | 32.0 |
| AQUABEAD 519 wax | 2.0 | 16.0 |
| WITCAMIDE 511 | 1.0 | 8.0 |
| Kaopolite 1152 | 10.0 | 80.0 |

AQUABEAD ® 519 wax is a micronized form of wax particle having an average particle size of three microns and available from Micro Powders Inc. of Scarsdale, N. Y. AQUABEAD ® is also a trademark of that company. WITCAMIDE ® 511 is an oil and water emulsifier and a trademark of the Witco Corporation of New York, N. Y. Kaopolite 1152 is an aluminum silicate clay abrasive.

Polish formulations conforming to the above were tested and evaluated on surfaces of a 1990 Buick Park Avenue motor vehicle and the results of these tests are shown in Table 1.

TABLE 1

| Test No. | Air T° °F. | Skin T° °F. | Humidity % | Dry Time Min. | Buff Ease | Dust | Smear | Streak | Mottle | Gloss |
|---|---|---|---|---|---|---|---|---|---|---|
| 1 | 67 | 94 | 60 | 30 | Mod. | V. Light | None | None | None | Good |
| 2 | 71 | 121 | 56 | 16 | Easy | V. Light | Light to Moderate | None | None | Good |
| 3 | 64 | 66 | 77 | 30 | Easy | Negligible | None | None | None | V. Good |
| 4 | 73 | 131 | 60 | 20 | V. Easy | Light to Moderate | Light | None | None | Good |

TABLE 1-continued

| Test No. | Air T° °F. | Skin T° °F. | Humidity % | Dry Time Min. | Buff Ease | Dust | Smear | Streak | Mottle | Gloss |
|---|---|---|---|---|---|---|---|---|---|---|
| 5 | 65 | 86 | 73 | 40 | V. Easy | V. Light | None | None | None | Good |

The presence of hydrolyzable groups on silicon contributes to the enhanced durability associated with the use of aminosilicones in automotive polishes. Hydrolyzable groups on silicon provide the capability to form adhesive bonds with the polished substrate. In addition, hydrolysis followed by condensation with other silanols, increases the molecular weight of the polish film and makes it less susceptible to flow or re-emulsification by detergents. Reactive amine-functional silicones, like those described in U.S. Pat. No. 3,960,575, are typically prepared by the base-catalyzed equilibration of dimethyl cyclics with a di- or tri-alkoxy functional aminosilane.or silicone. The resultant product contains pendant alkylamino groups along the siloxane backbone, and a relatively small concentration of available alkoxy groups on silicon which are available for crosslinking. In addition, the alkoxy groups on silicon are located along the polymeric backbone where steric factors contribute to the less reactive nature of these hydrolyzable groups.

The materials described in the present invention are also typically prepared by the base-catalyzed equilibration of cyclic siloxanes with an amine source. This polymer is then further reacted with an alkyl or aryl-substituted alkoxysilane or fluid, whereas the alkyl or aryl substitution on silicon contains functional groups which can react with and bond to nitrogen atoms(s) on the alkylamino chain of the siloxane fluid. As a result, some or all of the pendant chains contain reactive alkoxy functionality bound to a silyl group. This yields a higher concentration of sterically less hindered, and consequently more reactive, hydrolyzable groups on the resultant product. The higher concentration and more reactive nature of the hydrolyzable groups on silicon provides the fluid with greater potential to crosslink to a non-flowable, more durable cured film.

EXAMPLE III

About 200.0 grams of an aminosilicone fluid, 52 grams of n-butanol, and 16 grams of methacryloxypropyltrimethoxysilane were loaded into a three-necked flask equipped with a stirrer, thermometer, and condenser. The aminosilicone fluid was a trimethylsilyl-endblocked polydimethylsiloxane copolymer having an average degree of polymerization equal to 200, and containing 2.5 Mole % of randomly spaced (MeRSiO) repeat units and R was a $-CH_2CH(CH_3)CH_2NHCH_2CH_2NH_2$ pendant group on silicon. The mixture was heated in the presence of a nitrogen atmosphere and allowed to react at 80° C. for 16 hours. The flask and contents were cooled to room temperature and the product recovered.

EXAMPLE IV

About 100 grams of an aminosilicone fluid and 7.63 grams of glycidoxypropyltrimethoxysilane were combined in a round eight ounce jar equipped with a stir bar. The aminosilicone fluid was a trimethylsilyl-endblocked polydimethylsiloxane copolymer having an average degree of polymerization equal to 200, and containing 2.5 Mole % of randomly spaced (MeRSiO) repeat units and R was a $-CH_2CH(CH_3)CH_2NHCH_2CH_2NH_2$ pendant group on silicon. The jar was sealed and the contents were allowed to mix overnight at room temeprature.

EXAMPLE V

Water-in-oil based automotive polishes were formulated using the amine-functional silicones described in Examples III and IV. These polish compositions are shown in Table II. These polishes were applied to steel panels containing an automotive finish, and allowed to dry for one hour. The polishes were buffed out with moderate ease and minimal dusting to a glossy, defect-free film. Formulation A exhibited slightly better rub-out characteristics than polish formulations B through D. No differentiation in the rub-out characteristics of B, C, and D could be made with respect to one another.

TABLE II

| SAMPLE | A | B | C | D |
|---|---|---|---|---|
| Water | 55.3 | 55.3 | 55.3 | 55.3 |
| Kaopolite 1152 | 10.0 | 10.0 | 10.0 | 10.0 |
| Propylene glycol | 1.0 | 1.0 | 1.0 | 1.0 |
| Sodium Borate (5H$_2$O) | 0.5 | 0.5 | 0.5 | 0.5 |
| Kerosene | 26.2 | 26.2 | 26.2 | 26.2 |
| AQUABEAD 519 | 2.0 | 2.0 | 2.0 | 2.0 |
| WITCAMIDE 511 | 1.0 | 1.0 | 1.0 | 1.0 |
| Fluid (Example 2) | 4.0 | — | — | — |
| Fluid (Example 1) | — | 4.0 | 3.0 | 3.0 |
| Poly(phenylmethylsiloxane) fluid; | — | — | — | 1.0 |
| SiOH endblocked Aminofunctional Silicone 35 cs | — | — | 1.0 | — |

EXAMPLE VI 6574.6 grams of cyclic dimethylsiloxanes, 143.89 grams of 1.5 cs trimethyl endblocked polydimethylsiloxane, 404.89 grams of an amine-functional hydrolyzate MeRSi(OMe)$_2$ where R is $-CH_2CH(CH_3)CH_2NHCH_2CH_2NH_2$, and 2.065 grams of solid KOH were loaded into a twelve liter round-bottomed flask. The flask and contents were heated to 130° C. and held at that temperature for six hours. The mixture was then cooled to 40° C. and neutralized with a solution of acetic acid in cyclic dimethylsiloxanes. Following the neutralization step, 411.0 grams of chloropropyltrimethoxysilane and 451.6 grams of a 25% solution of sodium methylate in methanol were added to the reactor. The flask and contents were heated and maintained at 80° C. for six hours. The product was stripped at 68° C. and 1 atm for four hours under a N$_2$ purge at a rate of 160 ml/min. Once this step had been completed, the reactor and contents were cooled down and the product was recovered.

EXAMPLE VII

About 50 grams of an aminosilicone having an approximate average molecular weight of 2000, and an amine concentration of approximately 1.0 meq/gm of polymer was added to a round four ounce jar equipped with a stir bar. About 6 grams of glycidoxypropyltrimethoxysilane was added. The jar was sealed and the contents allowed to mix overnight at room temperature.

EXAMPLE VIII

The fluids described in Examples VI and VII were formulated into water-in-oil based automotive polishes E and F as shown in Table III. These polishes as well as a commercial polish known in the marketplace for excellent rub-out characteristics were applied to neighboring sections of an automotive finish. After drying for one hour, one half of each polished section was buffed to a glossy finish. All polish samples were easy to buff. Samples E and F were slightly easier to rub-out than the commercial product. After being allowed to dry over night, the second half of each polished section was buffed out. The hazy residue was more difficult to remove in all cases. Polish F was still slightly easier to rub out than the commercial polish, whereas formulation E had become more difficult to buff than either F or the commercial polish.

TABLE III

| SAMPLE | E | F |
| --- | --- | --- |
| Water | 54.8 | 54.8 |
| Kaopolite 1152 | 10.0 | 10.0 |
| Propylene glycol | 1.0 | 1.0 |
| Sodium Borate (5H2O) | 0.5 | 0.5 |
| TWEEN ® 20 | 0.5 | 0.5 |
| Kerosene | 25.2 | 25.2 |
| AQUABEAD ® 519 | 2.0 | 2.0 |
| Silicone Emulsifier* | 1.0 | 1.0 |
| Fluid of Example VI | 4.0 | — |
| Fluid of Example VII | — | 4.0 |
| Lustering Agent | 1.0 | 1.0 |

*= silicone glycol 75% in iso-propyl alcohol.

Micronized wax particles employed in the polish formulations of the present invention may be made from any conventional wax but preferably micronized particles of Fischer-Tropsch waxes, polyethylene wax, polyethylene-polytetrafluorethylene wax, polytetrafluorethylene wax, polypropylene wax, natural waxes, mineral waxes, montan wax derivatives, fatty acid derivatives, amide waxes and wax mixtures. The particle size of the micronized wax particles may vary from an average diameter of about two microns to about thirty to forty-five microns although particles sizes of from two to five microns are preferred. Such micronized wax particles are manufactured by Micro Powders, Inc., Scarsdale, N. Y. Other micronized wax particles suitable for incorporation into the polish formulations of the present invention are disclosed in U.S. Pat. No. 4,846,887, issued Jul. 11, 1989.

The polish formulations in accordance with the present invention are preferably in the form of an emulsion and include an oil phase containing a solvent, an organosilicon detergent resistant film forming compound, a surfactant and a wax. The water phase can include water, an abrasive, a freeze thaw additive such as propylene glycol and sodium borate, and colorants. Water in oil emulsions are preferred however oil in water emulsions are also included herein. It has been found that the polish formulations of the present invention possess the advantage in that the polish is easier to apply, the rub out is much improved and the appearance of a glossy surface is enhanced in comparison to conventional and prior art polish formulations which do not contain the novel polymers.

The polishes of the present invention are of general application including such surfaces as motor vehicles, boats and navigable crafts, wood surfaces, plastic surfaces and fiber surfaces. The films produce a high durable gloss and are easy to apply.

It will be apparent from the foregoing that many other variations and modifications may be made in the structures, compounds, compositions and methods described herein without departing substantially from the essential features and concepts of the present invention. Accordingly it should be clearly understood that the forms of the invention described herein are exemplary only and are not intended as limitations on the scope of the present invention.

That which is claimed is:

1. An aminofunctional organosilicon compound of the formula

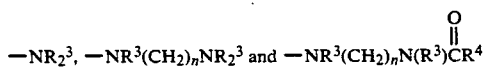

wherein R denotes an alkyl group of one to four carbons, OH, an alkoxy group or a phenyl group with the proviso that at least fifty percent of the total R groups are methyl; Q denotes an amine functional substituent of the formula $-R^2Z$, wherein $R^2$ is a divalent alkylene radical of three to six carbon atoms and Z is a monovalent radical selected from from the group consisting of $$-NR_2^3, -NR^3(CH_2)_nNR_2^3 \text{ and } -NR^3(CH_2)_nN(R^3)\overset{O}{\overset{\|}{C}}R^4$$

wherein $R^3$ denotes hydrogen or an alkyl group of one to four carbons, $R^4$ denotes an alkyl group of one to four carbons and n is an integer from two to six; x, y and z are integers the sum of which is within the range of about twenty-five to about eight hundred; 4 is at least one; and $Q^1$ denotes an amine functional substituent as defined above additionally including a carbon bonded silicon atom having at least one silicon-bonded hydrolyzable group.

2. The compound of claim 1 in which the carbon bonded silicon group is represented by the radical $$R_m-\underset{|}{Si}-(OR)_{3-m}$$

in which m is an integer having a value of zero, one or two and R is as defined in claim 1.

3. The compound of claim 1 in which R is selected from the group consisting of methyl, ethyl, propyl, isopropyl, butyl, isobutyl and phenyl with the proviso that at least fifty percent of the R groups are methyl.

4. The compound of claim 1 in which $R^2$ is selected from the group consisting of alkylene radicals trimethylene, tetramethylene, pentamethylene, —CH2CHCH3CH2— and —CH2CH2CHCH3CH2—.

5. The compound of claim 1 in which Z is selected from the group consisting of —NH2, —NHCH3, —NHCH2CH2CH2CH3, —N(CH2CH3)2, —NHCH2CH2NH2, —NH(CH2)6NH2, —NHCH2CH2CH2N(CH3)2, $$-NHCH_2CH_2NH\overset{O}{\overset{\|}{C}}CH_3 \text{ and}$$

-continued

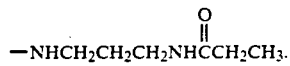

6. The compound of claim 1 in which R³ and R⁴ are selected from the group consisting of methyl, ethyl, propyl, butyl, isopropyl and isobutyl.

7. The compound

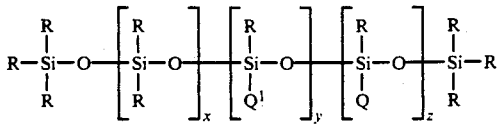

in which Q is —CH$_2$CHCH$_3$CH$_2$NHCH$_2$CH$_2$NH$_2$, Q$^1$ is —CH$_2$CHCH$_3$CH$_2$NHCH$_2$CH$_2$CH$_2$Si(OCH$_3$)$_3$, x, y and z are integers the sum of which is within the range of about twenty-five to about eight hundred, y is at least one, and R is an alkyl group of one to four carbon atoms, OH, an alkoxy group or a phenyl group, with the proviso that at least fifty percent of the total R groups are methyl.

* * * * *

UNITED STATES PATENT AND TRADEMARK OFFICE
CERTIFICATE OF CORRECTION

PATENT NO. : 5,110,891

DATED : May 5, 1992

INVENTOR(S) : Martin E. Cifuentes and David B. Selley

It is certified that error appears in the above-identified patent and that said Letters Patent is hereby corrected as shown below:

In Column 10, line 36, "4" should read ---y---.

Signed and Sealed this

Thirtieth Day of November, 1993

Attest:

BRUCE LEHMAN

Attesting Officer

Commissioner of Patents and Trademarks